United States Patent [19]

Pikulski

[11] Patent Number: 4,733,933

[45] Date of Patent: Mar. 29, 1988

[54] FIBER OPTIC STRUCTURE AND METHOD OF MAKING

[75] Inventor: Joseph L. Pikulski, Newberry Park, Calif.

[73] Assignee: Hughes Aircraft Company, Los Angeles, Calif.

[21] Appl. No.: 5,047

[22] Filed: Jan. 20, 1987

Related U.S. Application Data

[63] Continuation of Ser. No. 572,734, Jan. 20, 1984.

[51] Int. Cl.⁴ .......................... G02B 6/36; G02B 6/12; G02B 6/16; H01J 5/16
[52] U.S. Cl. .................. 350/96.20; 350/96.10; 350/96.29; 350/96.33; 250/227
[58] Field of Search ............... 350/96.10, 96.15, 96.20, 350/96.21, 96.23, 96.29, 96.30, 96.33; 250/227, 577, 293

[56] References Cited

U.S. PATENT DOCUMENTS

| | | | |
|---|---|---|---|
| 4,182,017 | 1/1980 | Ford et al. | 29/428 |
| 4,205,898 | 6/1980 | Matthews et al. | 350/96.21 |
| 4,287,427 | 9/1981 | Scifres | 250/577 |
| 4,468,294 | 8/1984 | Hocker et al. | 204/27 |
| 4,592,932 | 6/1986 | Biswas et al. | 427/163 |
| 4,609,437 | 9/1986 | Kruishoop et al. | 204/28 |

FOREIGN PATENT DOCUMENTS

| | | |
|---|---|---|
| 0038023 | 10/1981 | European Pat. Off. . |
| 0078049 | 5/1983 | European Pat. Off. . |
| 2103683 | 4/1972 | France . |
| 0021871 | 1/1981 | France . |
| 8303670 | 10/1983 | France . |
| 0124415 | 11/1984 | France . |
| 51-103442 | of 1976 | Japan . |
| 8201365 | 4/1982 | World Int. Prop. O. . |
| 2034068A | 5/1980 | United Kingdom . |
| 2113837 | 8/1983 | United Kingdom . |

Primary Examiner—William L. Sikes
Assistant Examiner—Akm E. Ullah
Attorney, Agent, or Firm—Terje Gudmestad; A. W. Karambelas

[57] ABSTRACT

A fiber optic structure comprising an optical fiber having a body of material deposited upon the exterior surface such that the body of material is sufficiently strong and rigid to permit processing of the fiber for various fiber optics applications. The process for forming the fiber optic structure involves the electroplating of a body of material upon the exterior surface of the optical fiber which is to be processed. A built-up body of fiber allows coupling structures to be created. The built-up body enables the fiber to be used as liquid level sensors and other types of mode strippers.

28 Claims, 17 Drawing Figures

FIBER OPTIC STRUCTURE AND METHOD OF MAKING

This is a continuation of application Ser. No. 06/572,734, filed 01/20/84.

BACKGROUND OF THE INVENTION

Optical fiber has electro-deposited thereon a metal body which permits the fiber to be mechanically acted upon by machining, positioning, or handling the metal body.

Fiber optic waveguides are small and fragile. It is important that the waveguides be firmly supported at least at their ends so that they can be ground and polished with facets or other surfaces which are optimum for coupling light into the fiber or for coupling the fiber with respect to another optical structure such as another optical fiber, a detector, or an integrated optic waveguide. In the past, epoxy adhesive has been employed for attaching a fiber optic waveguide to a surface for the purpose of building a coupling device for the end of the fiber, including polishing of the fiber end. One of the problems of this attachment is that the dimensional changes in the hardening epoxy adhesive cause external forces on the fiber optic waveguide. These forces cause microbending in the optical fiber resulting in significant signal losses. Microbending, localized changes in the optical fiber's index of refraction, must be minimized in order to maximize the signal and the signal-to-noise ratio. Thus, there is need for a structure which can be built up onto an optical fiber to permit handling of the optical fiber and to permit machining and otherwise processing the end of the optical fiber to enhance coupling and the like.

SUMMARY OF THE INVENTION

In order to aid in the understanding of this invention, it can be stated in essentially summary form that it is directed to a fiber optic structure and the method of making the fiber optic structure. The fiber optic structure comprises the depositing upon the exterior of the fiber a body of material which is sufficiently strong and rigid to permit machining and other handling of the fiber. The body of material should have a thermal coefficient of expansion substantially the same as that of the fiber optic material to minimize microbending and consequent microbending losses upon temperature change.

It is a purpose and advantage of this invention to provide a method of depositing a body on the exterior of a fiber optic waveguide in order to permit handling, machining, and connecting of the waveguide to other optical parts.

It is a further purpose and advantage of this invention to provide a metallic body deposited on a fiber optical waveguide in such a manner that the body minimizes microbending losses and permits machining and attachment of the fiber optic for optical interconnection therewith.

Other purposes and advantages of this invention will become apparent from a study of the following portion of the specification, the claims, and the attached drawings.

DETAILED DESCRIPTION OF THE INVENTION

Figure 1:
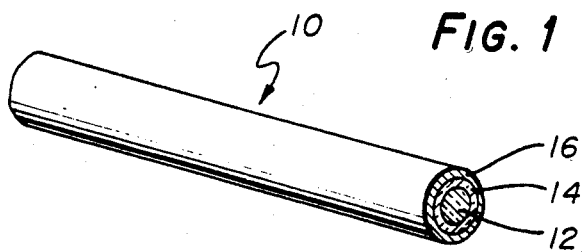
FIG. 1 is a perspective view of an optical fiber onto which a metallic body will be built up in accordance with the structure and method of this invention.

In FIG. 1, optical fiber 10 is the general indication of a typical coated optical fiber. Fiber core 12 is substantially transparent to the optical radiation of interest. It preferably carries an optical cladding 14 and a coating 16. Coating 16 can be either an organic material or an inorganic material such as aluminum. Such optical fibers can be made sufficiently flexible and optically transmissive to achieve the results required of optical fibers.

Figure 2:
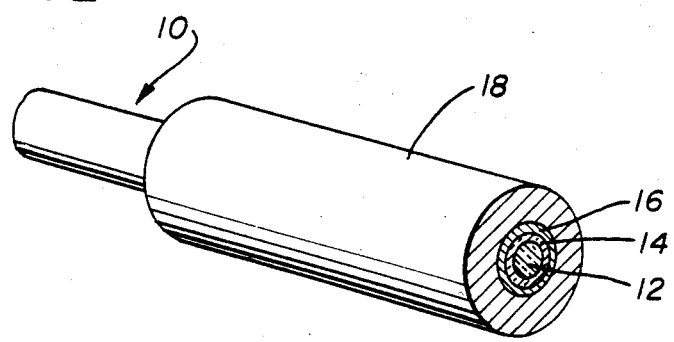
FIG. 2 is a perspective view of the same optical fiber of FIG. 1, showing a metal body built up thereon.

Referring to FIG. 2, copper body 18 is a built-up structure on coating 16 of fiber 10 when cladding is of an inorganic material such as aluminum. Alternatively, copper body 18 is a built-up structure on optical cladding 14 when coating 16 is of an organic material, coating 16 being removed therefrom prior to beginning of the build-up process.

When the optical cladding 14 is the exterior or material of the fiber, the length on which the body 18 is to be deposited can be made conductive by vapor deposition of silver or gold as a first step. Copper is particularly suited for the built-up structural body because it can be evenly and easily deposited upon the fiber. An even, localized-force-free deposition process eliminates localized forces which can cause microbending and consequent transmission losses. Other metals would be selected for the built-up structural body when found to be suitable for this even, localized-force-free deposition.

Copper body 18 is built up by electroplating. A suitable electroplating bath is prepared as follows: Two hundred twenty-five grams of copper sulphate are dissolved per liter of water. Fifty-five grams of sulfuric acid are also added per liter to provide the plating. A suitable electroplating bath is prepared. Two hundred twenty-five grams of copper sulphate are employed per liter of water. Fifty-five grams of sulfuric acid are also added per liter to provide the copper plating electrolyte. Added to the plating electrolyte solution is one-half milliliter of UBAC solution No. 1 per liter of electrolyte. This material is available from Udylite-Omic, 21441 Hoover Road, Warren, MI. 48089. This mixture acts to improve the fineness of the copper grain in the electrolytic build up. In the alternative, blackstrap molasses is also useful for the purpose of improving the fineness of the copper grain.

It is critical to the plating that the plating current be a maximum of 180 milliamperes per square inch. A higher current accelerates the ions in the plating solution and this, in turn, produces random orientation which results in graininess. Currents lower than the maximum current improve the fineness of the copper grain. The preferred current is 90 milliamperes per square inch. The plating voltage is from 0 to 3 volts, and the electrolyte temperature is maintained at 70 to 80 degrees F. The concentration of UBAC solution No. 1 in the electrolyte is maintained during the plating operation.

The plating operation must be carefully performed to minimize stresses in the copper plate body which would cause microbending. Microbending, localized changes in the optical fiber's index of refracting, is caused by forces applied to fiber 10. Copper body 18 is thereby deposited without substantial effect upon fiber 10. The result is that the copper body 18 produces a transmission loss of less than 0.01 decibels in the fiber. Plating continues until the copper body 18 is built up to the desired size.

Figure 3:
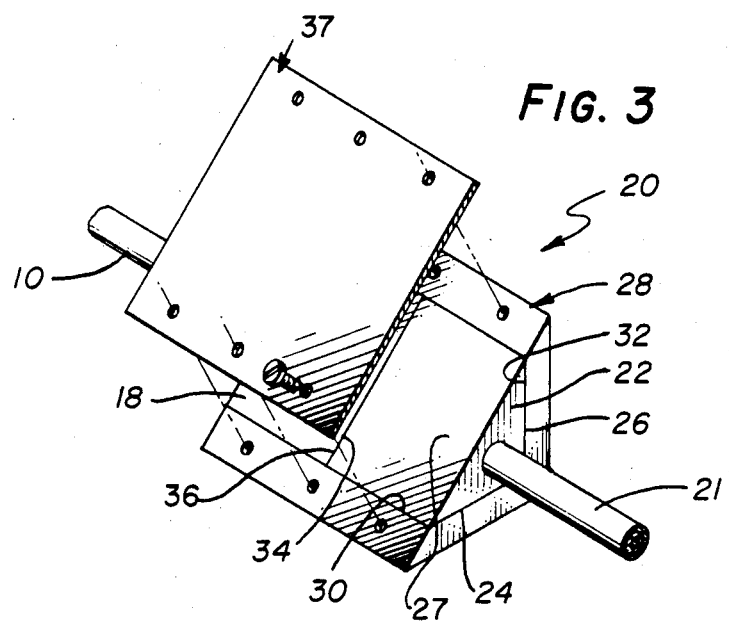
FIG. 3 is a perspective of two of the fibers of FIG. 2 with their bodies machined and lying against a fixture for endwise coupling of the optical fibers.

The built-up structural body is useful for creating structures of various utility and for use of the fiber 10 in various different applications. FIG. 3 illustrates coupler 20 wherein fiber 10 has its body 18 and another fiber 21 has its body 22 built up in the same manner. The bodies 18 and 22 can be plated against fixture 28 at the same time to maintain fiber alignment. Bodies 18 and 22 have faces 24 and 26 which are substantially planar and lie at right angles to each other. Fixture 28 has corresponding surfaces 30 and 32 also lying at right angles to each other to define the built-up bodies. Fibers 10 and 21 respectively extend to the joining faces 34 and 36 where they are ground and polished for optical coupling. The cover side 27 of bodies 18 and 22 are machined to permit cover plate contact. When bodies 18 and 22 are positioned against the fixture with their adjoining faces 34 and 36 in contact, then the two fibres 10 and 21 are in end-to-end optical coupling. Cover plate 37 holds them in place. Since optical fibers 10 and 21 are a fixed distance from the reference faces which adjoin the fixture, the coupling may be disassembled and reassembled with proper coupling.

Coupler 20 is useful over a range of temperatures and especially at high temperatures because the two bodies 18 and 22 have special features. When the bodies are made of copper, both have the same coefficient of expansion. Therefore, upon temperature change, optical fibers 10 and 21 remain in alignment. In addition, the deposition of copper is so uniform that over a change in temperature there is not an uneven application of pressure to the fibers 10 and 21 embedded therein. Such uneven expansion would cause uneven forces on the fiber which cause microbending and consequent losses.

Figure 4:
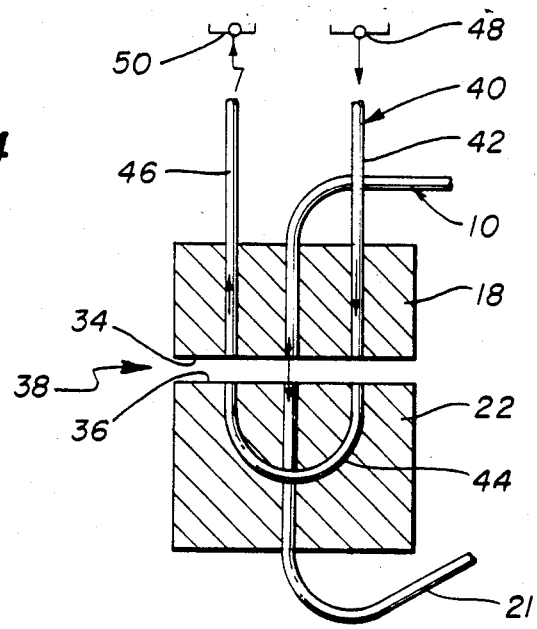
FIG. 4 is a side-elevational view, with parts broken away and parts taken in section of a fiber optic structure in accordance with this invention configured as a sensor in fiber optic waveguide link.

FIG. 4 illustrates coupler 38 which is similar to coupler 20. Again, the two fibers 10 and 21 are positioned in an end-to-end relationship and their ends are respectively encased in bodies 18 and 22. The bodies are cut and polished at faces 34 and 36 so that the bodies can lie together with the polished ends of fibers 10 and 21 in an optically connected relationship. Bodies 18 and 22 may be retained in alignment by means of a suitable fixture, such as fixture 28 illustrated in FIG. 3. Coupler 38 further incorporates fiber optic sensing loop 40 which includes source end 42, loop 44 and sensor end 46. As is seen in FIG. 4, ends 42 and 46 are both incorporated into body 18, preferably on opposite sides of optical fiber 10. Loop 44 is incorporated into body 22 in such a manner that all three interfaces are in alignment at the same time. In the present state of the art, metal-coated fibers can withstand very small bends in the fiber and survive in the bent condition for long periods of time. Accordingly, loop 44 can be positioned within one body 22 which has been plated from a solution to become an electroformed body.

Light source 48 is coupled to source end 42 and light sensor 50 is coupled to sensor end 46. By use of continuous detection at sensor 50, it can be determined when connector 38 is opened. This provides security sensing in the connector so that fibers 10 and 21 can be used in a cryptic transmission system. Thus, sensor 50 can detect when coupler 38 is being tampered with or being opened. Even in systems without the need for cryptic security, the use of the fiber optic sensing loop 40 can provide assurance that optical fibers 10 and 21 are in continuity through the coupler to provide confidence in the system for data transmission. Alignment of the several optical fibers in the coupler is assured by holding them in position and electroplating the bodies at the same time. In addition, it is preferable that the distances between the fibers and the reference faces in several connectors are universal so that the connectors are interchangeable.

Figure 5:
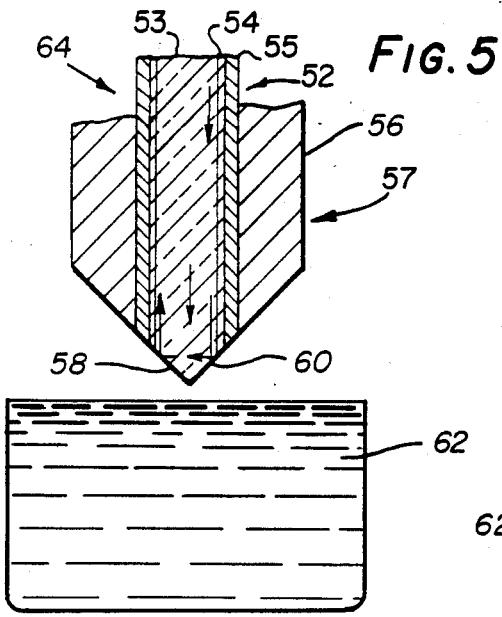
FIG. 5 is a side-elevational view, with parts broken away and parts taken in section showing an optical fiber with a metal body built up thereon and machined as a liquid level sensor, shown not sensing liquid.
Figure 6:
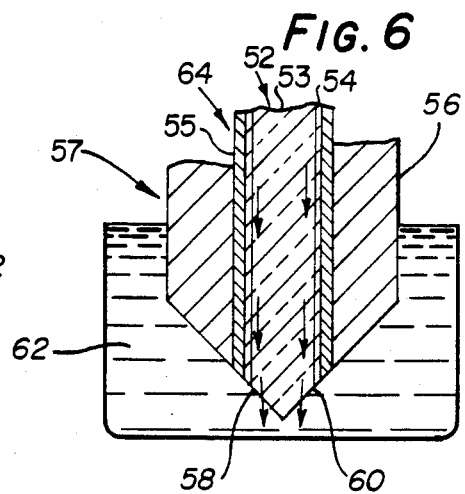
FIG. 6 is a view similar to FIG. 5, showing the device sensing liquid.

FIGS. 5 and 6 illustrate a liquid level system 64. Optical fiber 52 has a core 53, cladding 54, and coating 55. Body 56 is built up on optical fiber 52 at its sensing end 57. Body 56 is built up in the same way as was previously described for body 18. When there is an electrically conductive coating 55, such as aluminum, on optical cladding 54 this coating can then be used in the plating function for forming body 56 thereupon. If the coating is not electrically conductive or the coating is stripped from the cladding at the sensing end of the fiber, then a vapor deposited layer of silver or gold can be used on the cladding or bare fiber as the starting layer.

When body 56 is built up, its sensing end 57 is ground and polished into end faces which maximize internal reflection. Although as many end faces as desired can be used, two such end faces 58 and 60 are illustrated in FIGS. 5 and 6. The end faces form a right angle with respect to each other where the end faces meet on the tip of sensing end 57. The upper end (not shown) of the fiber has a light source and a light detector thereon and is called the detector end of the fiber. FIG. 5 illustrates sensor end 57 in a position wherein it is exposed to a gaseous environment. As faces 58 and 60 are open to a gaseous environment, the internal reflection returns a large signal, i.e., 60 percent, to the detector.

FIG. 6 illustrates sensor end 57 wherein end faces 58 and 60 are immersed in liquid 62. This immersion changes the reflection at the end faces. The major portion of the light does not reflect from the end faces, but passes out of fiber 52 and into liquid 62. Thus, when sensor end 57 is immersed in liquid, a much smaller signal is returned to the detector. The smaller return signal indicates that the liquid level is above the sensor end. In this way, the fiber acts as a liquid level sensing system.

In addition to holding the fiber so that the faces may be polished on the fiber, body 56 also serves to aid in retaining the sensing end of the fiber in position and protecting it against lateral forces, Thus, the liquid level sensing system 64 returns a substantial signal to the detector end when the sensor ends 57 is not immersed in liquid 62. The angle between the end faces may be other than at right angles in order to maximize the difference in signal between the immersed and non-immersed positions of the sensor end.

As end faces are made on sensor end 57, coating 55 and optical cladding 54 are exposed. In some cases, coating 55 may react with the liquid in which the sensor end is immersed. In these cases, coating 55 may be terminated before the end of the fiber. Upon formation of the end faces, coating 55 would be protected from the liquid by the electroformed body.

Figure 7:
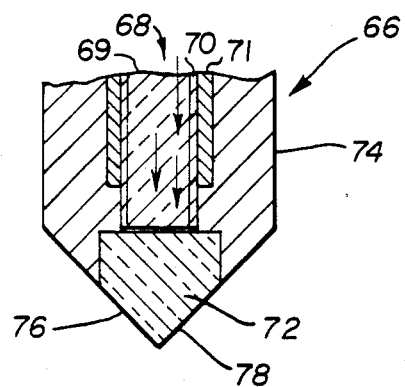
FIG. 7 is a view of structure similar to FIG. 5, but showing a window in the end of the sensor.

FIG. 7 illustrates liquid level sensing system 66 and shows only the sensing end of the system. Optical fiber 68 has its coating 71 terminated above the end of fiber 68. Coating 71 need not terminate above the end of fiber 68. In system 66, window 72 is butted to the end of fiber 68 and, thereupon, body 74 is plated around optical fiber 68 and window 72. This is to protect fiber 68 against a harsh external environment into which sensor is immersed. Deposition of body 74 is the same as was for the previously described deposition of body 18. When deposition is complete, faces 76 and 78 are ground and polished on window 72. The faces are formed at such angles as to maximize internal reflection when the faces are not immersed in liquid and to minimize reflection when they are immersed in liquid.

The detector end (not shown) of optical fiber 68 is opposite the sensor end and is provided with a light source and a detector. Thus, system 66 returns substantial reflection to the detector when the sensor end is not immersed and returns little reflection to the detector when the sensor end is immersed in liquid. System 66 provides window 72 to protect the fiber. The angles of the faces are ground and polished to best utilize the laws of total internal reflection. The window may be of any suitable material compatible with the liquid and wavelength of interest. Diamond and sapphire are suitable materials in some cases.

Figure 8:
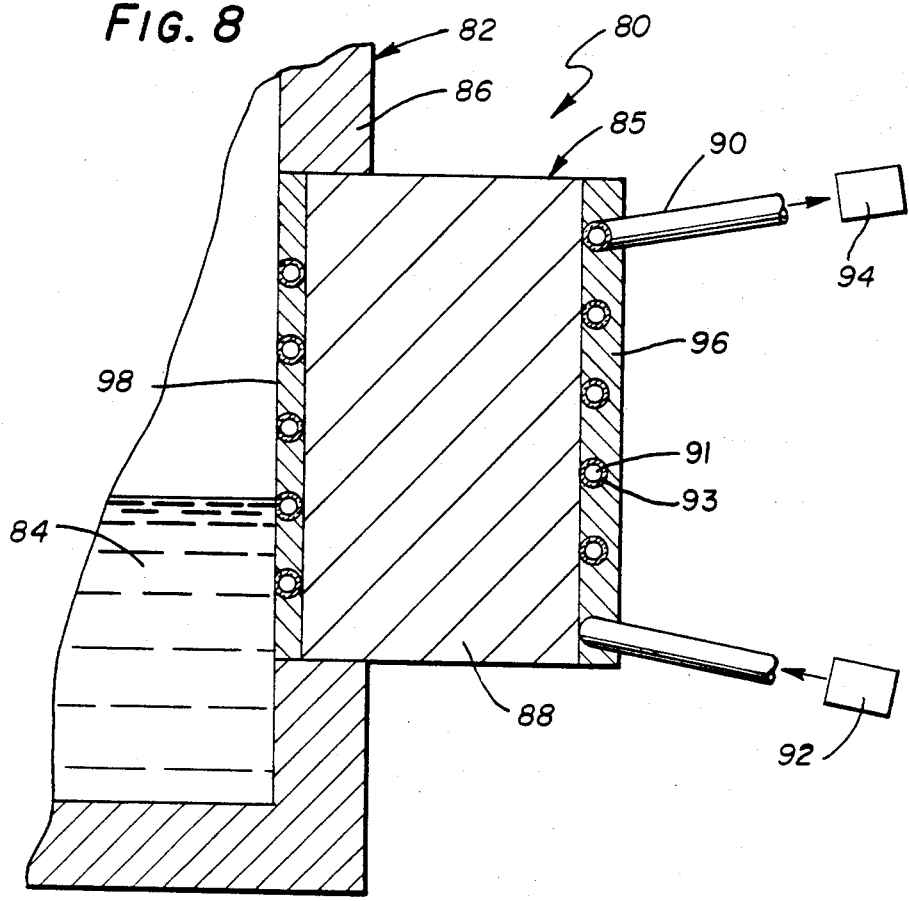
FIG. 8 is a side-elevational view, with parts broken away and parts taken in section of a liquid level sensor in accordance with this invention.

FIG. 8 illustrates another liquid level sensing system 80. Vessel 82 has at least side walls and a bottom for retaining liquid 84. Liquid level sensor 84 is built into wall 86 of vessel 82. Mandrel 88 has optical fiber 90 wrapped spirally around it as a continuous fiber. Connected to opposite ends of optical fiber 90 are light source 92, which may be a light-emitting diode, and light detector 94. Optical fiber 90 is wrapped around mandrel 88 with a spacing between two adjacent fibers being the smallest increment in liquid level to be detected. This optical fiber-wrapped-mandrel assembly is then coated with a body of material 96 to bury fiber 90 and rigidly hold it in place. The choice of a coating material depends on the harshness of the environment to which liquid level sensing system 80 will be exposed. In accordance with this invention, it is preferred that the body of material 96 be built up by electroplating, the same way as previously described for body 18. Copper is a suitable material for some environments, or other materials which can be plated can be employed as body 96. Once the fiber has been protected by body 96, sensor side 98 is ground and polished so that optical cladding 93 of optical fiber 90 is exposed and fiber core 91 is fairly close to, but below the polished surface of sensor side 98. After the cladding is exposed by polishing, liquid level sensor 85 is placed in the side of vessel 82, as indicated in FIG. 8.

In liquid level sensing system 80 of FIG. 8, optical fiber 90 is composed of core 91 covered by optical cladding 93. The fiber core is of any conventional core material, such as quartz glass, and the cladding is a glass cladding which reflects light back into the core. Thus, some of the light passes through the cladding, and this light will be stripped away where liquid comes into contact with the polished cladding.

The liquid level sensing system of FIG. 8 has a restriction on the diameter of mandrel 88. The diameter of mandrel 88 must be chosen so that it is large enough to prevent the rapid loss of optical power in the first few turns of optical fiber 90 around mandrel 88 with a small diameter mandrel, light is radiated into the optical cladding 93 of the first few turns of fiber 40 resulting in the optical power loss. With large diameter mandrels and high numerical aperture fibers, the problem is minimized. When a smaller mandrel diameter is used, a higher numerical aperture is required in the fiber to minimize the radiation loss. As the mandrel diameter increases, the requirement of a higher numerical aperture decreases. As a general rule, the numerical aperture is inversely proportional to the mandrel diameter.

As a specific example, with a mandrel of ten inches in diameter, an optical fiber with a fifteen micron core and glass cladding and having a length of six feet can be wound around the mandrel with four exposed turns on the sensor side 98. For such purpose, an optical fiber having a numerical aperture of 0.2 was used. Using a helium-neon laser and a silicon detector, when none of the exposed cladding portions on the sensor side 98 are immersed in water, the signal arriving at detector 94 would be about 90 percent of the light emitted by source 92.

As the light from the core is radiated into the cladding, there is a substantial amount of power which can be mode-stripped from cladding 93 when adjacent the liquid. The drop in the optical power of detector 94 represents the liquid level. Liquid 84, monitored in vessel 82, is the mode-stripper. As liquid 84 rises in the vessel, it reduces the light detected at detector 94 by about 3 percent for each of the exposed portions of cladding 93 which is covered by liquid 84. In between each loop a bend is introduced to radiate more light into cladding 93. Since only one detector is employed in response to five different liquid levels in the example illustrated, liquid level sensing system 80 can be considered a quasianalog system. Closer spacing of the turns provides for detection of smaller increments in liquid level height and more turns provides for a greater range in detection.

Figure 9:
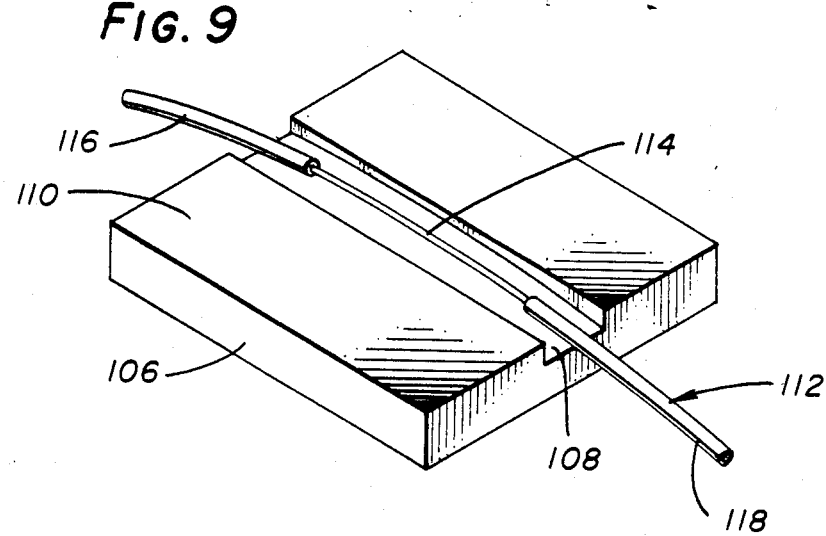
FIG. 9 is an isometric view of the first assembly of a fiber optic with respect to a base to produce a four port coupler.
Figure 10A:
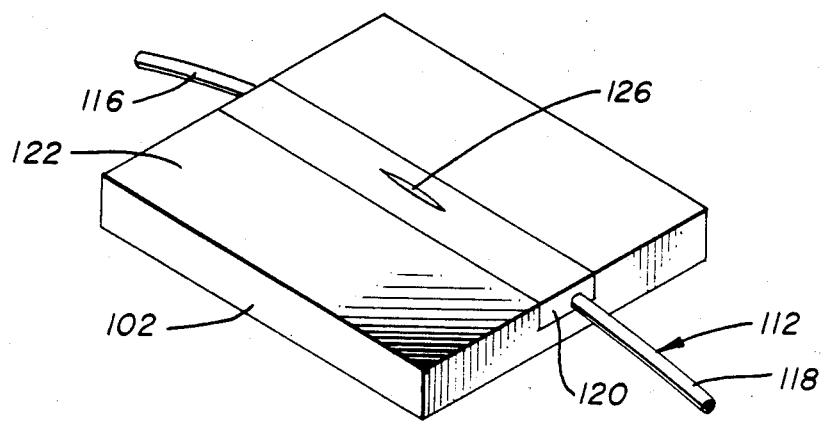
FIG. 10a is a view of the structure of FIG. 9, after the deposition of a metal body to hold the fiber optic in place with respect to the base.
Figure 10C:
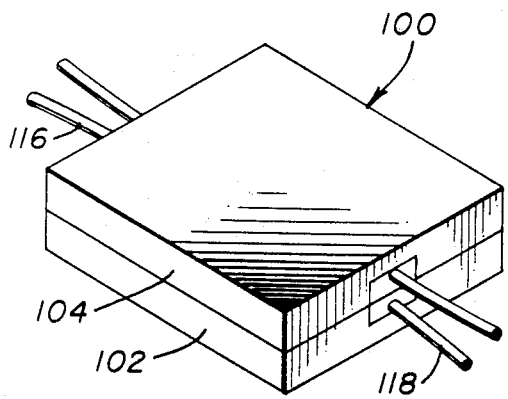
FIG. 10c is an isometric view of the assembled four port coupler.
Figure 10B:
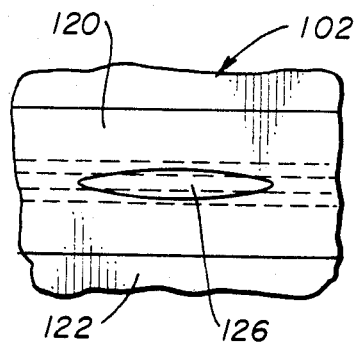
FIG. 10b is an enlarged plan view, with parts broken away, showing the port in the fiber optic.

FIG. 10c shows rigid four port fiber optic directional coupler 100. It is constructed of coupler halves 102 and 104. The completed coupler half 102 is shown in FIGS. 10a and 10b, while an intermediate stage of the construction is shown in FIG. 9. In FIG. 9, substrate 106 has a cut groove 108 below face 110 thereof. Groove 108 has a gentle radius of curvature, convex toward the top, as seen in FIG. 9. Optical fiber 112 is laid lengthwise in groove 108. When optical fiber 112 has an organic or otherwise non-electrically conductive coating on its cladding, the coating is stripped, thereby exposing the cladding. Stripped section 114, wherein the cladding is exposed, is illustrated in FIG. 9. However, when optical fiber 112 is coated with aluminum, such coating may be left on or may be removed. In FIG. 9, the stripped section 114 lies against the highest part of the curved surface of groove 108, and ends 116 and 118 extend away from face 110 of substrate 106 for connection purposes. While stripped section 114 and the rest of optical fiber 112 are held in place, groove 108 is filled by plating, in the manner described with respect to FIG. 2. Plated body 120 therefore fills groove 108, as is indicated in FIG. 10a. The top of the combined structure of substrate 106, optical fiber 112, and body 120 is ground and polished on top face 122. The grinding and polishing process continues until the core in single-mode optical fibers is totally exposed. In multi-mode optical fibers, the grinding and polishing may be done to either partially or totally expose the core. As is seen in FIG. 10b, ground and polished face 122 nearly exposes core 124 in this single-mode case and exposes cladding 126. This completes coupler half 102 of which coupler half 104 is identical.

When the two coupler halves 102 and 104 are placed together in face-to-face relationship with the core and cladding of their respective optical fibers adjoining, they form a stable four port directional coupler as illustrated in FIG. 10c. Directional coupler 100 has greater durability, stability, and provides less change over temperature fluctuations than previously constructed couplers. The reason for this is that the plated body applies uniform pressure over the fiber to minimize microbending, even during temperature changes. The embodiment of a substantial length of the optical fiber 112 into body 120 also provides strain relief to the fiber. This serves to minimize stresses at the active area which is exposed by polishing.

Figure 11:
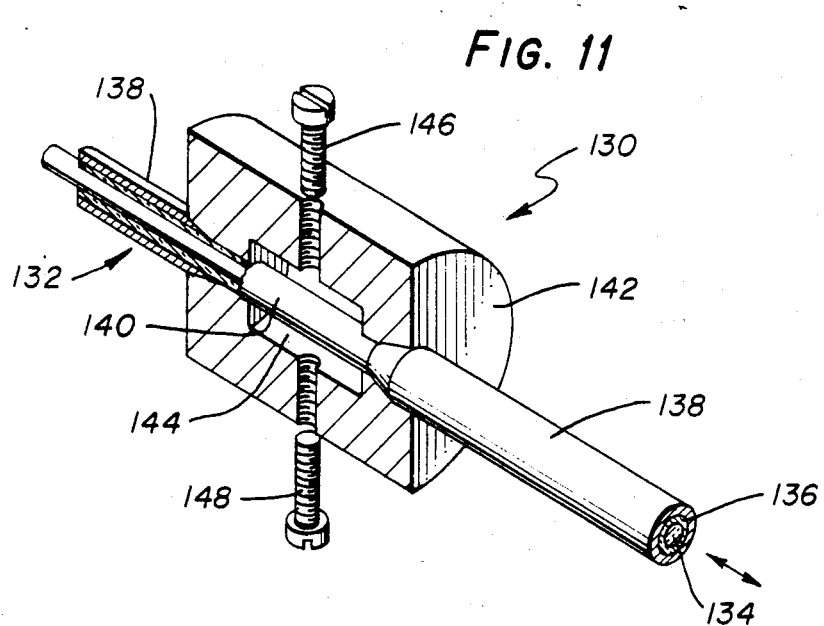
FIG. 11 is an isometric view of a mode stripper call made in accordance with this invention, with parts broken away and parts taken in section.

Mode-stripper 130 shown in FIG. 11 strips signals at the exterior of the optical cladding by changing the characteristics at the surface of the optical cladding. Optical fiber 132 comprises optical core 134 and glass cladding 136. Coating 138 is applied to the optical fiber 132 on glass cladding 136. The coating may be organic or may be metallic, such as aluminum, as described with respect to FIGS. 1 and 2. To create mode-stripper 130, the coating 138 is removed to provide an uncoated section 140. Body 142 of the mode-stripper 130 is built up around uncoated section 140. Stripper cavity 144 is provided by building up a suitable wax matrix on the fiber. Screws 146 and 148 are mounted in the wax matrix. Thereupon, body 142 is built up by electro-deposition, the same way as was previously described for body 18. In order to properly plate those areas which are not electrically conductive, the uncoated fiber, the wax matrix, and plastic screws 146 and 148 (and coating 138 if it is not conductive) receive a vapor-deposited layer of silver or gold. This deposited layer provides for even electro-deposition of metal which will make up body 142.

After body 142 is built up to the desired size, screws 146 and 148 are removed. Thereupon, the wax matrix can be removed by solvent wash so that cavity 144 is created. Cavity 144 is, thereupon, filled with the proper mode-stripper compound, usually a high index oil. Screws 146 and 148 are replaced. It permanent replacement is desired, metallic screws can be used and soldered in place. Furthermore, if desired, electro-deposited material can be placed over the metal screws to completely cover them.

Mode-stripper 130 is shown as being formed along the length of optical fiber 132. This construction can be incorporated into a coupling if an adjoining coupling is desired. Thus, mode-stripper 130 can be made into body 18 of coupling 20 of FIG. 3.

Figure 12:
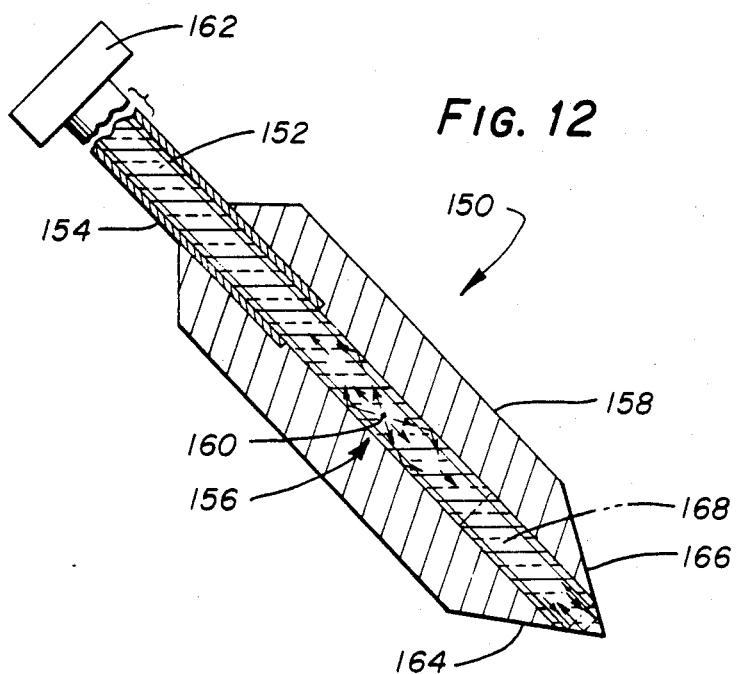
FIG. 12 is a longitudinal section through a fiber optic structure formed as an extended range temperature sensor.

Temperature sensor 150 is illustrated in FIG. 12. Clad optical fiber 152 carries coating 154. The coating is stripped in the temperature-sensing region 156. Body 158 is built up in the temperature-sensing region and overlaps coating 154.

The materials used in the temperature sensor are based on the temperature to be sensed. Quartz begins to emit usefully detectable visable radiation at about 600 degrees C. (while at lower temperatures other types of radiation is detectable) and softens at 1,660 degrees C. There is an increasing intensity of the emitted radiation from this lower limit to this upper limit. Thus, clad optical fiber 152 can be of quartz and body 158 can be of nickel or a high-temperature, platable alloy. Body 158 is built up in the same way as was previously described for body 18. Coating 154 is stripped far enough back so that it is not subject to degradation from temperature. When an incandescent point 160 emits light, some of the light passes toward detector 162 which receives the light passing upward in the fiber. The tip of sensor 150 is ground and polished to become a plurality of reflecting faces 164 and 166. Light passing down the fiber toward the lower end, where reflecting faces 164 and 166 are located, is reflected back toward detector 162. This reflection at the tip increases the useful signal by at least 40 percent.

Other temperature ranges are possible by employing an insert 168 at the tip which emits an optical signal over the desired temperature range. The built-up body 158 is of a suitable material for the selected temperature range and serves to protect the portion of the fiber in the high-temperature region. The total internal reflection which occurs at the tip of the sensor enhances its utility.

Figure 13:
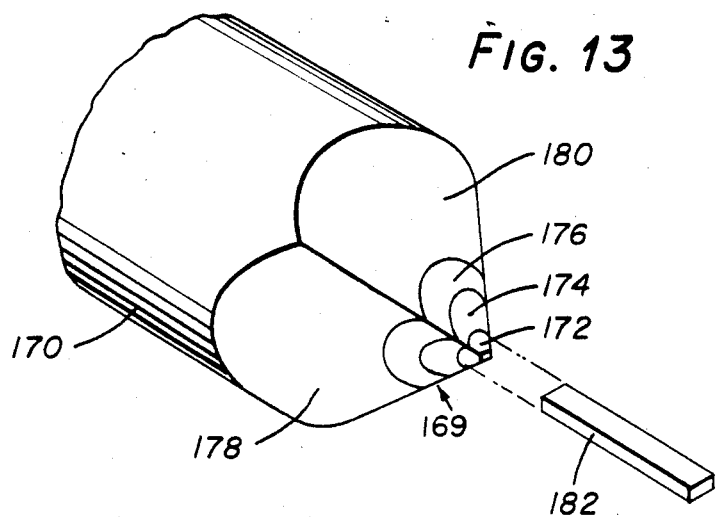
FIG. 13 is a perspective view of the metal body on the end of a fiber optic shaped for coupling with a laser light source.

Holding an optical fiber for processing, during processing, and holding it during coupling to a light source also finds a solution in the electroplating of a body of material. FIG. 13 illustrates body 170 built up on an optical fiber. Optical fiber 169 comprises core 172, cladding 174 and coating, if any, 176. The coating may be aluminum, may be organic, or may be absent. When the coating is organic or absent, the exterior of the fiber is coated with a conductive material. The vapor deposition of silver or gold onto the exterior serves as an electro-deposition starting point, as previously described. Thereupon, a body 170 is built up on the end of the fiber, as illustrated, in the same manner as the electro-deposition of body 18.

When body 170 is built up, it serves to protect the fiber, and, when the electro-deposition is properly carried out, there is a minimum of stresses on the fiber so that microbending is minimized. After deposition of body 170, faces 178 and 180 are ground and polished on the fiber and the body. These faces are configured for optimum coupling of the maximum amount of light emanating from a light source into the fiber. A light source is illustrated in FIG. 13 as light source 182. Light source 182 may be a laser diode which has a light output pattern that matches core 172 of fiber 169. Light source 182 is positioned with its emission directed toward fiber 169. Fiber 169 can then be positioned with respect to light source 182 and clamped in that position by employing body 170. This protects the fiber as well as positioning and securing it with respect to the light source. The metal built-up body 170 provides a one-time built-up structure which provides optimum support for processing, i.e., grinding and polishing; it permits reprocessing of the faces, if necessary; and it provides a stable support for final mounting.

Figure 14:
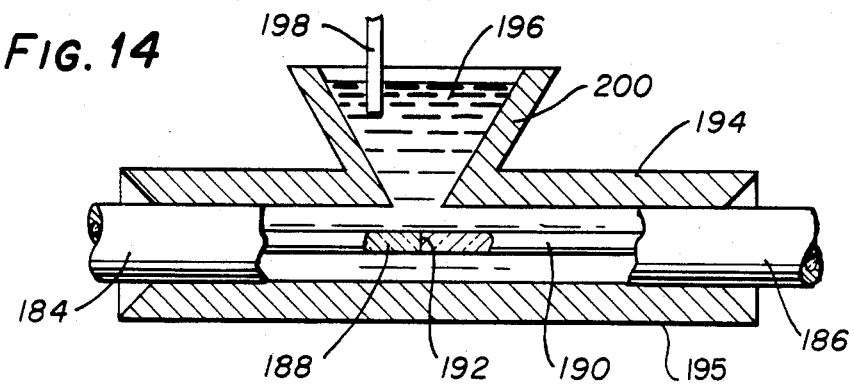
FIG. 14 is a side-elevational view, with parts broken away and parts taken in section showing the process of and the apparatus for recoating a spliced joint in a metal clad optical fiber.
Figure 15:
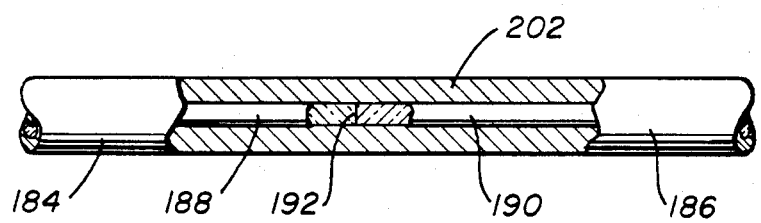
FIG. 15 is a side-elevational view of the completed joint formed according to the process of an apparatus of FIG. 14.

A further embodiment of the invention disclosed therein is the use of the electroplating process to coat optical fibers after they have been spliced thereby protecting the splice and providing a uniform optical fiber. FIGS. 14 and 15 show coated optical fibers 184 and 186. The coating is stripped back to provide bare but glass-clad fibers 188 and 190. The fibers are joined by fusing at splice 192, a technique well known in the art of fiber optics. After the fusing at splice 192 is completed, fixture halves 194 and 195 are clamped around the bare fiber at the spliced area. A far fixture half 194 and a similar near half 195 are clamped together to closely embrace and seal against coated fibers 184 and 186. The metal coating of the fibers is cathodically connected and then fixture 194 is filled with plating solution 196 of the character previously described with respect to the build up of body 18. Anode 198 is immersed in the plating solution and plating current is provided. Copper builds up from the aluminum coating toward sprue 200. With the continued application of plating current, the plated copper faces build up toward each other and join in the center beneath the sprue and the plated metal works itself into the sprue opening. The result is body 202. When the build up of body 202 is completed, fixture halves 194 and 195 are removed and body 202 is smoothed as necessary to provide an outer surface which is the same diameter as coated fibers 184 and 186. This splicing operation is useful in creating long lengths of optical fiber, lengths beyond the capability of present production of single fibers. In addition, splice 192 provides a reflection signal so that such splices may be placed in the fiber at known lengths for calibration purposes. Since the spliced fiber is now the same diameter as the original coated fiber, it may be wrapped on a mandrel with a minimum amount of microbending and radiation losses.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fiber optic structure comprising:
   an optical fiber; and
   a metallic body of radial thickness on the order of 0.003" or above, deposited on said fiber and surrounding said fiber for strengthening and rigidizing said fiber within said metallic body so that said metallic body and said fiber may be acted upon and positioned for optical purposes, with substantial reduction of microbending losses in said fiber.

2. The fiber optic structure of claim 1 wherein said metallic body is an electro-deposited body.

3. The fiber optic structure of claim 2 wherein said electro-deposited body is copper body.

4. The fiber optic structure of claim 3 wherein said body is positioned adjacent the end of the optical fiber.

5. The fiber optic structure of claim 1 wherein said body is positioned adjacent the end of the optical fiber.

6. A fiber optic structure comprising:
   at least one optical fiber; and
   at least one metallic body deposited on a respective part of said fiber for rigidizing said respective part of said fiber encased within said at least one metallic body so that said fiber may be acted upon and positioned for optical purposes, said at least one metallic body having a radial thickness at least on the order of 0.003", and being processed at an exterior surface area so as to make said respective part of said fiber encased within, optically accessible at said surface.

7. The fiber optic structure of claim 6 wherein said structure is a liquid sensor with said optical fiber being for connection to a source and a detector, said exterior surface area being configured at an angle such that internal reflection from said exterior surface area is promoted when said exterior surface are is not immersed in liquid and inhibited when said exterior surface area is immersed in liquid.

8. The fiber optic structure of claim 6 wherein said structure is a temperature sensor, with said exterior surface area reflecting light produced within said fiber as a function of temperature.

9. A fiber optic structure comprising:
   first and second optical fibers; and
   first and second metallic bodies respectively deposited on and encasing respective parts of said first and second optical fibers, said first and second bodies each having an exterior surface area with said respective part of said first and second optical fibers respectively exposed at said respective exterior surface area, said first and said second bodies each having a radial thickness at least on the order of 0.003" and being positioned so that said first and second fibers are optically connected, said first and second metallic bodies being deposited in a manner which substantially avoids undesired alteration of the respective indices of refraction of said first and second optical fibers.

10. The fiber optic structure of claim 9 wherein both said first and second metallic bodies are electro-deposited metallic bodies.

11. The fiber optic structure of claim 10 wherein said first and second electro-deposited bodies are copper bodies.

12. The fiber optic structure of claim 11 wherein the ends of said first and second fibers are respectively exposed at said exterior surface areas of said bodies and said bodies are positioned for end-to-end optical connection between said first and second fibers.

13. The fiber optic structure of claim 9 wherein there is a looped optical fiber in said second body and there is a source and a detector fiber within said first body, all of said fibers being positioned so that when said first and second optical fibers are in alignment, said looped fiber interconnects said source and said detector fibers so that when said looped fiber does not have continuity, said first and second fibers lack continuity.

14. The fiber optic structure of claim 9 wherein said first and second optical fibers are exposed at said faces intermediate the ends of said optical fibers so that positioning of said faces for coupling of said optical fibers provides a four port coupler.

15. A fiber optic structure comprising:
first and second optical fibers each having an end;
first and second metallic bodies respectively electro-deposited on said ends of first and second optical fibers, said first and second bodies having polished adjoining faces wherein said ends of said optical fibers are exposed, said first and second bodies each also having two reference faces; and
a fixture, said fixture being shaped so that when said reference faces of said bodies lie in said fixture, said first and second optical fibers are in endwise optical alignment.

16. The fiber optic structure of claim 15 wherein both said first and second metallic bodies are formed of electro-deposited copper.

17. A fiber optic structure comprising:
first and second optical fibers, each having an end;
first and second metallic bodies respectively carried on said first and second optical fibers adjacent their ends, said first and second bodies respectively having adjoining faces with said first and second optical fibers exposed at said adjoining faces, said first and second metallic bodies being positionable so that said first and second optical fibers are in optical alignment;
a source optical fiber and a detector optical fiber being respectively for connection to a light source and a light detector, said source fiber and said detector fiber each having ends and being positioned within said first body so that said ends are exposed at said face of said first body; and
a loop optical fiber having ends, said loop optical fiber being at least partially positioned within said second body and having its ends exposed at said face of said second body, said source, said loop and said detector optical fibers being positioned so that they are in optical continuity when said first and second optical fibers are in optical continuity.

18. The fiber optic structure of claim 17 wherein both said first and second bodies are formed of electro-deposited copper.

19. A fiber optic structure comprising:
a mandrel;
an optical fiber having a source end and a detector end, said optical fiber being wrapped in a plurality of turns around said mandrel, said source end being for connection to a light source and said detector end being for connection to a light detector;
said optical fiber having an optical cladding;

a built-up metallic body deposited around said fiber; and
said body having a sensor face, the cladding on said fiber being exposed at said sensor face so that as the exposed portions of cladding are successively immersed in liquid, the amount of light arriving at the detector end is decreased.

20. The fiber optic structure of claim 19 wherein a light source is connected to said source end and a light detector is connected to said detector end of said fiber.

21. The fiber optic structure of claim 20 wherein at least a portion of said body is positioned within a tank so that as liquid rises in said tank, said exposed cladding portions are successively covered to reduce light output at the detector end of said fiber.

22. The fiber optic structure of claim 19 wherein at least a portion of said body is positioned within a tank so that as liquid rises in said tank, said exposed cladding portions are successively covered to reduce light output at the detector end of said fiber.

23. A four-port fiber optic coupler comprising:
first and second optical fibers, each of said fibers having ends;
first and second electro-deposited built up metallic bodies respectively on said first and second optical fibers intermediate the ends thereof, said bodies constraining said optical fibers to a curved configuration within said body; and
said first and second metallic bodies each having a face thereon, said optical fibers being exposed at said faces so that when said faces are placed together with said exposed fibers in alignment, a four-port coupling is formed.

24. The fiber optic structure of claim 23 wherein each said body is electro-deposited copper.

25. A fiber optic structure comprising:
an optical fiber, said optical fiber having such properties as to produce an optical change upon change in temperature of said optical fiber, said fiber having an end; and
a metal body on said end of said fiber, said fiber and said body having a face to reflect light within said fiber at the end of said fiber so that temperature can be more easily sensed when said metallic body on the end of said fiber is placed in location for temperature sensing.

26. The fiber optic structure of claim 25 wherein said body is formed of electro-deposited copper.

27. A fiber optic structure comprising:
first and second optical fibers, each of said optical fibers having a cladded optic core and a coating, said cladded optic cores being fused together to form a splice at a section wherein said coating is removed; and
a metallic body positioned around said cladded optic core and between said coating on said optical fibers to protect the splice between said cores and to provide a substantially uniform diameter body which is substantially equal to the diameter of said metallic covering.

28. The fiber optic structure of claim 27 wherein said body is electro-deposited copper formed around said core and between said coating.

* * * * *